(12) United States Patent
Kumar et al.

(10) Patent No.: US 12,338,155 B2
(45) Date of Patent: Jun. 24, 2025

(54) ENCLOSURES FOR PROVIDING A CONTROLLED ENVIRONMENT DURING THE PRODUCTION OF GLASS ARTICLES

(71) Applicant: CORNING INCORPORATED, Corning, NY (US)

(72) Inventors: Purushotam Kumar, Corning, NY (US); Sean Thomas Miller, Elmira, NY (US); Elias Panides, Horseheads, NY (US); Yujian Sun, Painted Post, NY (US)

(73) Assignee: CORNING INCORPORATED, Corning, NY (US)

( * ) Notice: Subject to any disclaimer, the term of this patent is extended or adjusted under 35 U.S.C. 154(b) by 103 days.

(21) Appl. No.: 17/410,131

(22) Filed: Aug. 24, 2021

(65) Prior Publication Data

US 2022/0064046 A1    Mar. 3, 2022

Related U.S. Application Data

(60) Provisional application No. 63/071,570, filed on Aug. 28, 2020.

(51) Int. Cl.
  *C03B 17/04*    (2006.01)
  *C03B 23/00*    (2006.01)

(52) U.S. Cl.
  CPC ............ *C03B 17/04* (2013.01); *C03B 23/008* (2013.01)

(58) Field of Classification Search
  CPC .................................................. C03B 23/008
  See application file for complete search history.

(56) References Cited

U.S. PATENT DOCUMENTS 3,615,327 A * 10/1971 McLary .................. C03C 17/00
                                                    118/503
3,623,854 A * 11/1971 Frank ..................... C03C 17/245
                                                    118/301

(Continued)

FOREIGN PATENT DOCUMENTS

| CN | 203297165 U | 11/2013 |
| JP | 10-067540 A | 3/1998 |
| WO | 2019/103610 A1 | 5/2019 |

OTHER PUBLICATIONS

JP 2013245141 machine translation, Makihara Kazumasa, Method and Apparatus for Producing Glass Preform, Dec. 2013 (Year: 2013).*

(Continued)

*Primary Examiner* — Queenie S Dehghan
(74) *Attorney, Agent, or Firm* — Chandra J. Duncan

(57) ABSTRACT

An enclosure for providing a controlled environment includes a central plane extending through a top end of the enclosure and a bottom end of the enclosure and bisecting the enclosure along a width of the enclosure, an inlet at the bottom end of the enclosure having an inlet width, $W_{inlet}$, an enclosure wall extending from the inlet to the top end of the enclosure, an entry port at the top end of the enclosure, and an outlet between the entry port and the chamber region of the enclosure wall. The enclosure wall comprises a chamber region and a transition region between the inlet and the chamber region. The width of the chamber region, $W_{chamber}$, is substantially constant through the chamber region. The width of the enclosure in the transition region decreases from $W_{chamber}$ to $W_{inlet}$, and a ratio of $W_{inlet}$ to $W_{chamber}$ is from 1:2 to 1:5.

15 Claims, 11 Drawing Sheets

(56) References Cited

U.S. PATENT DOCUMENTS

| | | | | |
|---|---|---|---|---|
| 3,694,872 | A | * | 10/1972 | Sundbeck ............... D02J 1/224 |
| | | | | 425/66 |
| 3,895,126 | A | | 7/1975 | Strauss et al. |
| 4,248,615 | A | * | 2/1981 | Seng ....................... C03B 3/023 |
| | | | | 264/117 |
| 2014/0255575 | A1 | * | 9/2014 | Bhushan ................ A23L 19/00 |
| | | | | 99/538 |
| 2016/0083293 | A1 | | 3/2016 | Okada |
| 2018/0155465 | A1 | * | 6/2018 | Kanellopoulos ....... B01J 8/1818 |

OTHER PUBLICATIONS

KR 19990030052 machine translation, Amano et al., Bottle Manufacturing Method, Apr. 1999 (Year: 1999).*

International Search Report and Written Opinion of the International Searching Authority; PCT/US2021/044584; dated Jan. 24, 2022; 10 pages; European Patent Office.

* cited by examiner

ENCLOSURES FOR PROVIDING A CONTROLLED ENVIRONMENT DURING THE PRODUCTION OF GLASS ARTICLES

CROSS-REFERENCE TO RELATED APPLICATIONS

This application claims the benefit of priority under 35 U.S.C. § 119 of U.S. Provisional Application Ser. No. 63/071,570 filed on Aug. 28, 2020, the content of which is relied upon and incorporated herein by reference in its entirety.

TECHNICAL FIELD

Embodiments of the present disclosure generally relate to controlled environments, and, more specifically, to controlled environments for use in the production of glass articles.

BACKGROUND

Glass articles may be used in a variety of applications, including product packaging and specialty applications. Depending on the particular application, the glass article may include a coating on the exterior of the glass article to impart a particular characteristic, such as to reduce or prevent scratches, to reflect UV light, or to impart a color on the surface of the glass. Coatings may be applied during the glass manufacturing process using any one of a variety of known techniques. However, the performance of some techniques, such as spray coating techniques, often depends on the ambient environmental conditions in which the process occurs and in which the glass articles are located shortly after the process occurs. Moreover, vapors from solvents used in the coatings may evaporate from the surface of recently coated glass articles.

Accordingly, there is a need for enclosures to provide a controlled environment during the manufacture of glass articles with coatings.

SUMMARY

Various embodiments provide enclosures that surround the glass articles and provide a controlled environment during at least part of the glass manufacturing process. The enclosures described herein can reduce the amount of temperature-and-humidity-controlled, filtered air required for the environment, and efficiently capture solvent evaporating from the glass articles, thereby preventing the solvent vapors from contaminating the ambient environment. Additionally, the enclosures of various embodiments can reduce or prevent contamination of the glass article from particles present in the ambient environment that may render the glass article unsuitable for its intended end use application.

According to one or more embodiments, an enclosure for providing a controlled environment comprises a central plane extending through a top end of the enclosure and a bottom end of the enclosure and bisecting the enclosure along a width of the enclosure; an inlet at the bottom end of the enclosure having an inlet width, $W_{inlet}$; an enclosure wall extending from the inlet to the top end of the enclosure; an entry port at the top end of the enclosure configured to receive a part carrier; and an outlet between the entry port and the chamber region of the enclosure wall. The enclosure wall comprises a chamber region and a transition region between the inlet and the chamber region. The width of the chamber region, $W_{chamber}$, is substantially constant through the chamber region. The width of the enclosure in the transition region decreases from $W_{chamber}$ to $W_{inlet}$, and a ratio of $W_{inlet}$ to $W_{chamber}$ is from 1:2 to 1:5. The central plane passes through the inlet and the entry port of the enclosure, and the outlet extends along an outlet axis that is oriented at a non-zero angle with respect to the central plane.

According to one or more embodiments, a manufacturing line for producing glass articles comprises an enclosure, and a part carrier. The enclosure comprises a central plane extending through a top end of the enclosure and a bottom end of the enclosure and bisecting the enclosure along a width of the enclosure; an inlet at the bottom end of the enclosure having an inlet width, $W_{inlet}$; an enclosure wall extending from the inlet to the top end of the enclosure; an entry port at the top end of the enclosure configured to receive a part carrier; and an outlet between the entry port and the chamber region of the enclosure wall. The enclosure wall comprises a chamber region and a transition region between the inlet and the chamber region. The width of the chamber region, $W_{chamber}$, is substantially constant through the chamber region. The width of the enclosure in the transition region decreases from $W_{chamber}$ to $W_{inlet}$, and a ratio of $W_{inlet}$ to $W_{chamber}$ is from 1:2 to 1:5. The central plane passes through the inlet and the entry port of the enclosure and the outlet extends along an outlet axis oriented at a non-zero angle with respect to the central plane. A gripping member of the part carrier is positioned through the entry port and the part carrier is configured to move a glass article through the chamber region of the enclosure.

According to one or more embodiments, a method for transporting a coated article is provided. The method comprises positioning the coated article within an enclosure; supplying a flow of fluid to the enclosure through the inlet; removing a flow of fluid from the enclosure through the outlet; and moving the coated article along a path through the enclosure, where the path is substantially parallel to the central plane. The enclosure comprises a central plane extending through a top end of the enclosure and a bottom end of the enclosure and bisecting the enclosure along a width of the enclosure; an inlet at the bottom end of the enclosure having an inlet width, $W_{inlet}$; an enclosure wall extending from the inlet to the top end of the enclosure; an entry port at the top end of the enclosure configured to receive a part carrier; and an outlet between the entry port and the chamber region of the enclosure wall. The enclosure wall comprises a chamber region and a transition region between the inlet and the chamber region. A width of the chamber region, $W_{chamber}$, is substantially constant through the chamber region. The width of the enclosure in the transition region decreases from $W_{chamber}$ to $W_{inlet}$, and a ratio of $W_{inlet}$ to $W_{chamber}$ is from 1:2 to 1:5. The central plane passes through the inlet and the entry port of the enclosure and the outlet extends along an outlet axis oriented at a non-zero angle with respect to the central plane.

These embodiments are described in more detail in the following Detailed Description in conjunction with the appended drawings.

BRIEF DESCRIPTION OF THE DRAWINGS

The following detailed description of specific embodiments of the present disclosure can be best understood when read in conjunction with the following drawings, where like structure is indicated with like reference numerals and in which.

DETAILED DESCRIPTION

Figure 1:
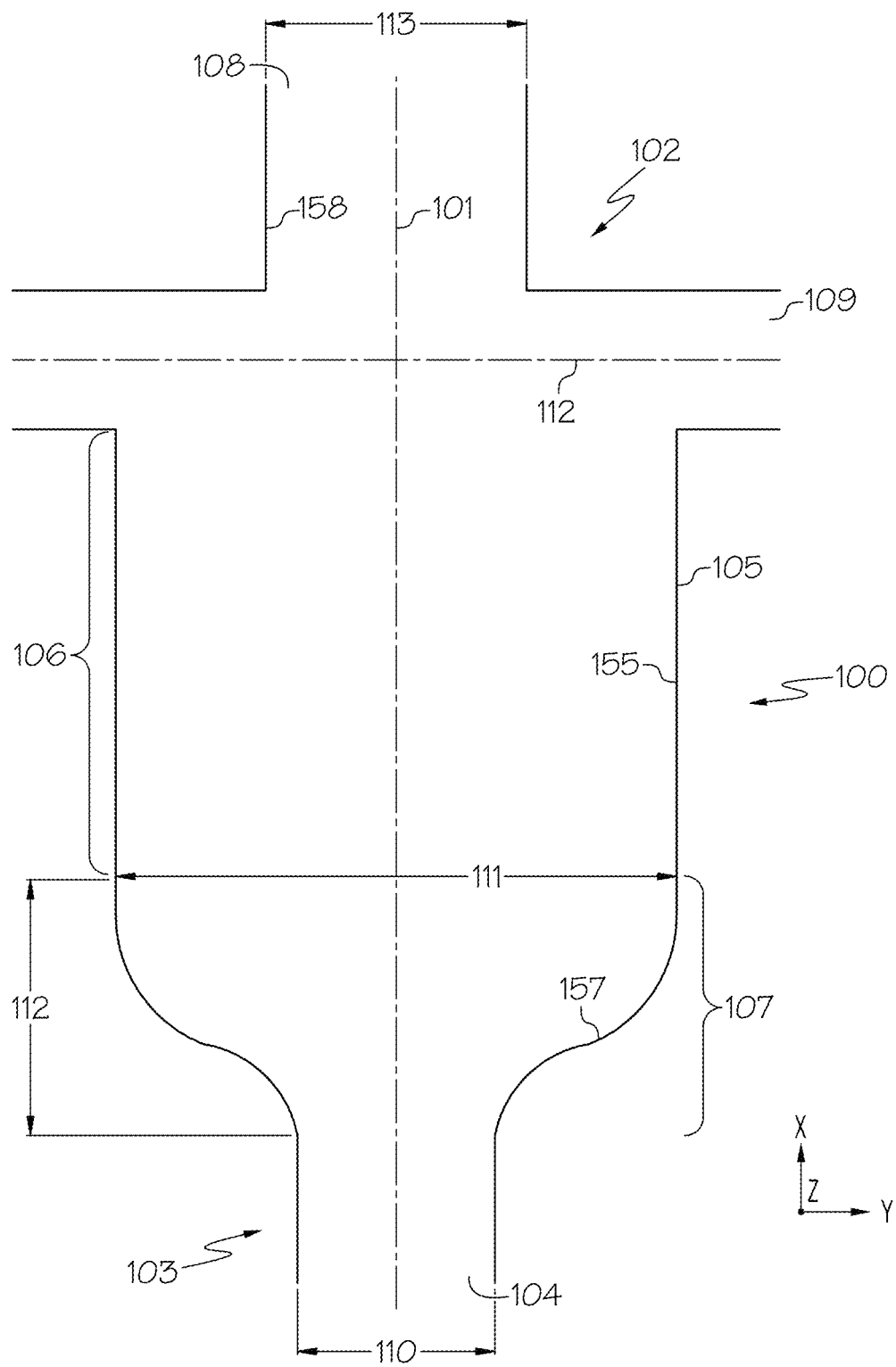
FIG. 1 schematically depicts a cross section of an enclosure for providing a controlled environment, according to one or more embodiments disclosed herein.

Reference will now be made in detail to embodiments of enclosures used in conjunction with the manufacture of coated glass articles, examples of which are illustrated in the accompanying drawings. Whenever possible, the same reference numerals will be used throughout the drawings to refer to the same or like parts. One embodiment of an enclosure is schematically depicted in FIG. 1. The enclosure generally includes an enclosure wall, an inlet at the bottom end of the enclosure, a transition region, a chamber region, an entry port at the top of the enclosure and an outlet between the entry port and the chamber region. A central plane passes through the top end and the bottom end of the enclosure and bisects the enclosure along a width of the enclosure. Various embodiments of enclosures used for the manufacture of coated glass articles will be described herein with specific reference to the appended drawings.

It is noted that one or more of the claims presented herein utilize the term "wherein" as a transitional phrase. When used, this term is introduced in the claims as an open-ended transitional phrase that is used to introduce a recitation of a series of characteristics of the structure and should be interpreted in like manner as the more commonly used open-ended preamble term "comprising."

Directional terms as used herein—for example up, down, right, left, front, back, top, bottom—are made only with reference to the figures as drawn and are not intended to imply ab solute orientation.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

As used herein, a "controlled environment" refers to an enclosed or partially enclosed volume in which certain atmospheric conditions are maintained within set boundaries. For example, temperature, pressure, and humidity may be kept within specified ranges within a controlled environment. Additionally, the entrance of particles into the controlled environment may be regulated, for example, by filtration of incoming air.

As used herein, "laminar flow" refers to the flow of a fluid including, without limitation, air that is free from cross-currents, eddies, swirls, and lateral mixing.

As used herein, an "inflection point" refers to a point along a curve where the curve transitions from concave to convex or from convex to concave.

As used herein, "reflection symmetry" refers to symmetry of an object with respect to a plane wherein the reflection of the object along that plane is indistinguishable from the object itself.

FIG. 1 depicts an embodiment of an enclosure 100 for providing a controlled environment along at least a portion of, for example, a glass manufacturing line for producing coated glass articles. In particular, FIG. 1 schematically depicts a cross-section of the enclosure 100 along an XY plane as defined by the coordinate axes included in FIG. 1. A central plane 101 provides a reference for several aspects of the enclosure 100. Specifically, the central plane 101 provides a reference for defining the symmetry of the enclosure 100, a position of an inlet 104 and an entry port 108 of the enclosure 100, and an orientation of an outlet 109 of the enclosure 100. In embodiments, the central plane 101 extends through a top end 102 and a bottom end 103 of the enclosure 100 in the +/−X direction. Additionally, the central plane 101 extends in the Z direction through the length of the enclosure. In embodiments, the central plane 101 bisects the enclosure 100 along a width of the enclosure, for example, along a width of the inlet ($W_{inlet}$ 110), a width of a chamber region ($W_{chamber}$ 111), or a width of an entry ($W_{entry}$ 113).

The enclosure 100 includes at least one enclosure wall 105, which extends from the bottom end 103 of the enclosure 100 to the top end 102 of the enclosure 100 and defines various regions of the enclosure 100. For example, the enclosure wall 105 defines a chamber region 106 and a transition region 107 of the enclosure 100. In some embodiments, the enclosure 100 includes two enclosure walls that oppose one another. For example, the enclosure 100 may include enclosure walls on opposite sides of the central plane 101. In embodiments, the enclosure wall 105 includes one or more apertures through the enclosure wall 105. For example, apertures through the enclosure wall 105 can include the inlet 104 and the outlet 109 of the enclosure 100. In embodiments, the enclosure wall 105 may comprise any material that is sufficiently smooth to facilitate laminar flow of air through the enclosure. For example, the enclosure wall 105 may be formed from an opaque material, such as sheet metal or other, similar materials. In some embodiments, a transparent material, such as a polymer or plastic resin (e.g., PLEXIGLAS' available from Arkema), may form the enclosure wall 105 to allow visual inspection of the various regions of the enclosure 100, including the chamber region 106 and the transition region 107. In further embodiments, the enclosure wall 105 may be formed from a combination of opaque and transparent materials, such that at least a portion of the enclosure's interior may be visible from outside the enclosure 100. For example, in such embodiments, at least a portion of the chamber region 106 or the transition region 107, or both may be visible from the exterior of the enclosure 100.

The inlet 104 is located at the bottom end 103 of the enclosure 100. In embodiments, the inlet 104 is an opening in the enclosure wall 105 that allows air to enter the enclosure 100. Alternatively, the inlet 104 may be formed between two opposing enclosure walls instead of being formed through a single enclosure wall. The inlet 104 has a width, $W_{inlet}$ 110. In FIG. 1, the width is measured in the Y direction from the inner surface 155 of the enclosure wall 105 to an opposing inner enclosure wall surface (e.g., the width is an interior width of the inlet 104). In embodiments, $W_{inlet}$ 110 is greater than or equal to 4 mm and less than or equal to 45 mm. For example, $W_{inlet}$ 110 may be from 4 mm to 45 mm, from 4 mm to 40 mm, from 4 mm to 35 mm, from 4 mm to 30 mm, from 4 mm to 25 mm, from 4 mm to 20 mm, from 4 mm to 15 mm, from 4 mm to 10 mm, from 10 mm to 45 mm, from 15 mm to 45 mm, from 20 mm to 45 mm, from 25 mm to 45 mm, from 30 mm to 45 mm, from 35 mm to 45 mm, or even from 40 to 45 mm. In embodiments, the central plane 101 passes through the inlet 104 and bisects $W_{inlet}$. In such embodiments, $W_{inlet}$ 110 is measured normal to the central plane 101. Although depicted in FIG. 1 as having a constant width over a height (+/−X direction) of the inlet 104, it is contemplated that in embodiments, the width of the inlet 104 may vary. In such embodiments, $W_{inlet}$ corresponds to the minimum interior width of the inlet 104.

As shown in FIG. 1, the enclosure wall 105 of the enclosure 100 defines a chamber region 106. In embodiments, the enclosure wall 105 extends in the X and Z directions through the chamber region 106 and is substantially parallel to the central plane 101 through the chamber region 106.

The chamber region 106 has a width, $W_{chamber}$ 111. In FIG. 1, the width is measured in the Y direction from the inner surface 155 of the enclosure wall 105 to an opposing inner surface 155 of the enclosure wall 105 (e.g., the width is an interior width of the chamber region 106). In embodiments, $W_{chamber}$ 111 is substantially constant throughout the chamber region 106. In embodiments, $W_{chamber}$ 111 is greater than or equal to 20 mm and less than or equal to 90 mm. For example, $W_{chamber}$ 111 may be from 20 mm to 90 mm, from 30 mm to 90 mm, from 40 mm to 90 mm, from 50 mm to 90 mm, from 60 mm to 90 mm, from 70 mm to 90 mm, or even from 80 mm to 90 mm. In further examples, $W_{chamber}$ 111 may be from 20 mm to 80 mm, from 20 mm to 70 mm, from 20 mm to 60 mm, from 20 mm to 50 mm, from 20 mm to 40 mm, or even from 20 mm to 30 mm. Other values for the width 111 of the chamber region 106 are possible, provided that the width 111 is large enough to allow for adequate airflow around the maximum diameter of the part being transported through the enclosure 100. In embodiments, $W_{chamber}$ 111 is from 2 to 3 times the maximum diameter of the part. Additionally, in embodiments, the central plane 101 passes through the chamber region 106 of the enclosure 100 and bisects $W_{chamber}$ 111. In such embodiments, $W_{chamber}$ 111 is measured normal to the central plane 101.

The enclosure 100 further comprises a transition region 107 between the inlet 104 and the chamber region 106. In embodiments, the transition region 107 is enclosed by a section of the enclosure wall 105 that is not parallel to the central plane 101. In the transition region 107, the width (e.g., the interior width) of the enclosure 100 decreases from $W_{chamber}$ 111 to $W_{inlet}$ 104. In embodiments, the decrease in width of the enclosure 100 takes place over a distance 112 (e.g., measured in the +/−X direction in FIG. 1) parallel to the central plane 101. In embodiments, the distance 112 is greater than or equal to 200 mm and less than or equal to 900 mm. For example, the distance 112 may be from 200 mm to 900 mm, from 300 mm to 900 mm, from 400 mm to 900 mm, from 500 mm to 900 mm, from 600 mm to 900 mm, from 700 mm to 900 mm, or even from 800 mm to 900 mm. In further examples, the distance 112 may be from 200 mm to 800 mm, from 200 mm to 700 mm, from 200 mm to 600 mm, from 200 mm to 500 mm, form 200 mm to 400 mm, or even from 200 mm to 300 mm. In further embodiments, the distance 112 may be about ten times larger than $W_{chamber}$ 111. Other distances are possible and contemplated, provided that one-dimensional fluid flow is maintained at both the chamber-end and the inlet end of the transition region 107. In embodiments, the ratio of $W_{inlet}$ 110 to $W_{chamber}$ 111 is from 1:2 to 1:5 or from 1:3 to 1:4. Without being bound by theory, it is believed that a transition region 107 dimensioned as described above (i.e., where the ratio of $W_{inlet}$ 110 to $W_{chamber}$ 111 is from 1:2 to 1:5) may facilitate laminar air flow through the enclosure 100 by ensuring that the change in width of the enclosure 100 is not so sudden that eddies or other turbulent flow patterns are present in the air flowing from the inlet 104 into the chamber region 106. However, it is contemplated that in embodiments, the flow through the transition region 107 may include transitional or turbulent flow, although the flow of fluid at both the chamber-end and the inlet end of the transition region 107 is one-dimensional.

In embodiments, the enclosure wall 105 has an S-shaped curve within the transition region 107 of the enclosure 100, as illustrated in FIG. 1. In embodiments, the S-shaped curve comprises an inflection point 157 at which a change in a direction of the curvature occurs. Without being bound by theory, it is believed that the presence of an S-shaped curve in the transition region 107 may help facilitate laminar air flow through the enclosure 100 by providing a smooth transition from the inlet 104 to the chamber region 106 of the enclosure 100. Although an S-shaped curve is specifically shown and described herein, it should be understood that other smooth curves and transitional shapes are possible and contemplated, provided they do not cause air flowing through the enclosure 100 to recirculate or become turbulent upon entry into the chamber region 106. For example, in embodiments, the transition region 107 can be linear given a large enough distance 112 to enable one-dimensional fluid flow to be preserved without backflow.

The enclosure 100 also comprises an entry port 108 at the top of the enclosure 100 that is configured to receive a part carrier (not shown in FIG. 1). The entry port 108 can be, for example an opening or slot through which the part is conveyed. The entry port 108 has a width, $W_{entry}$ 113, measured in the Y direction from an inner surface 158 of the entry port 108 to an opposing inner surface 158 of the entry port 108. In embodiments, $W_{entry}$ 113 is contingent on the dimensions of the part carrier. In embodiments, $W_{entry}$ 113 is greater than or equal to 1.0 cm and less than or equal to 5.0 cm. For example, $W_{entry}$ 113 may be from 1.0 cm to 5.0 cm, from 1.5 cm to 5.0 cm, from 2.0 cm to 5.0 cm, from 2.5 cm to 5.0 cm, from 3.0 cm to 5.0 cm, from 3.5 cm to 5.0 cm, from 4.0 cm to 5.0 cm, or even from 4.5 cm to 5.0 cm. In further examples, $W_{entry}$ 113 may be from 1.0 cm to 4.5 cm, from 1.0 cm to 4.0 cm, from 1.0 cm to 3.5 cm, from 1.0 cm to 3.0 cm, from 1.0 cm to 2.5 cm, from 1.0 cm to 2.0 cm, or even from 1.0 cm to 1.5 cm. However, it should be understood that other dimensions for $W_{entry}$ 113 are contemplated and possible, provided that the part carrier can freely move through the entry port 108 (e.g., along the +/−Z direction in FIG. 1). In embodiments, $W_{entry}$ 113 is less than $W_{chamber}$ 111. As shown in FIG. 1, the central plane 101 passes through the entry port 108 and, in embodiments, bisects the entry port 108 along $W_{entry}$ 113. In such embodiments, $W_{entry}$ 113 is measured normal to the central plane.

In embodiments, the enclosure 100 further comprises at least one outlet 109 positioned between the entry port 108 and the chamber region 106 of the enclosure 100. In embodiments, the width of the outlet 109 is from 0.5 cm to 3.0 cm. For example, the width of outlet 109 may be from 0.5 cm to 3.0 cm, from 1.0 cm to 3.0 cm, from 1.5 cm to 3.0 cm, from 2.0 cm to 3.0 cm, or even from 2.5 cm to 3.0 cm. In further examples, the width of outlet 109 may be from 0.5 cm to 2.5 cm, from 0.5 cm to 2.0 cm, from 0.5 cm to 1.5 cm, or even from 0.5 cm to 1.0 cm. The outlet 109 extends along an outlet axis 112. In embodiments, the outlet axis 112 is oriented at a non-zero angle with respect to the central plane 101. For example, the outlet axis 112 may be normal with respect to the central plane 101. In the embodiment shown in FIG. 1, the outlet axis 112 extends from the central plane 101 in the +/−Y direction and lies within a YZ plane. In some embodiments, the enclosure 100 may comprise two outlets 109 where the outlets 109 are on opposite sides of the central plane 101 and the outlets 109 extend away from the central plane 101 along the outlet axis 112. For example, in embodiments in which the left wall and right wall of the enclosure 100 are different walls separated from one another at the ends of the enclosure 100, each wall can include an outlet 109, with the outlets being symmetrically situated. As another example, in embodiments in which the "left wall" and the "right wall" of the enclosure are different regions along a length of material (e.g., where a single wall has a circular or oval-shape), the outlet 109 can be a single channel running along the length of the wall.

In various embodiments, the enclosure 100 comprises reflection symmetry with respect to the central plane 101. Without wishing to be bound by theory, it is believed that the symmetry of the enclosure 100 may facilitate a symmetric airflow pattern through the enclosure 100, which, in turn, may facilitate smooth, or laminar, airflow through the enclosure 100.

Figure 2:
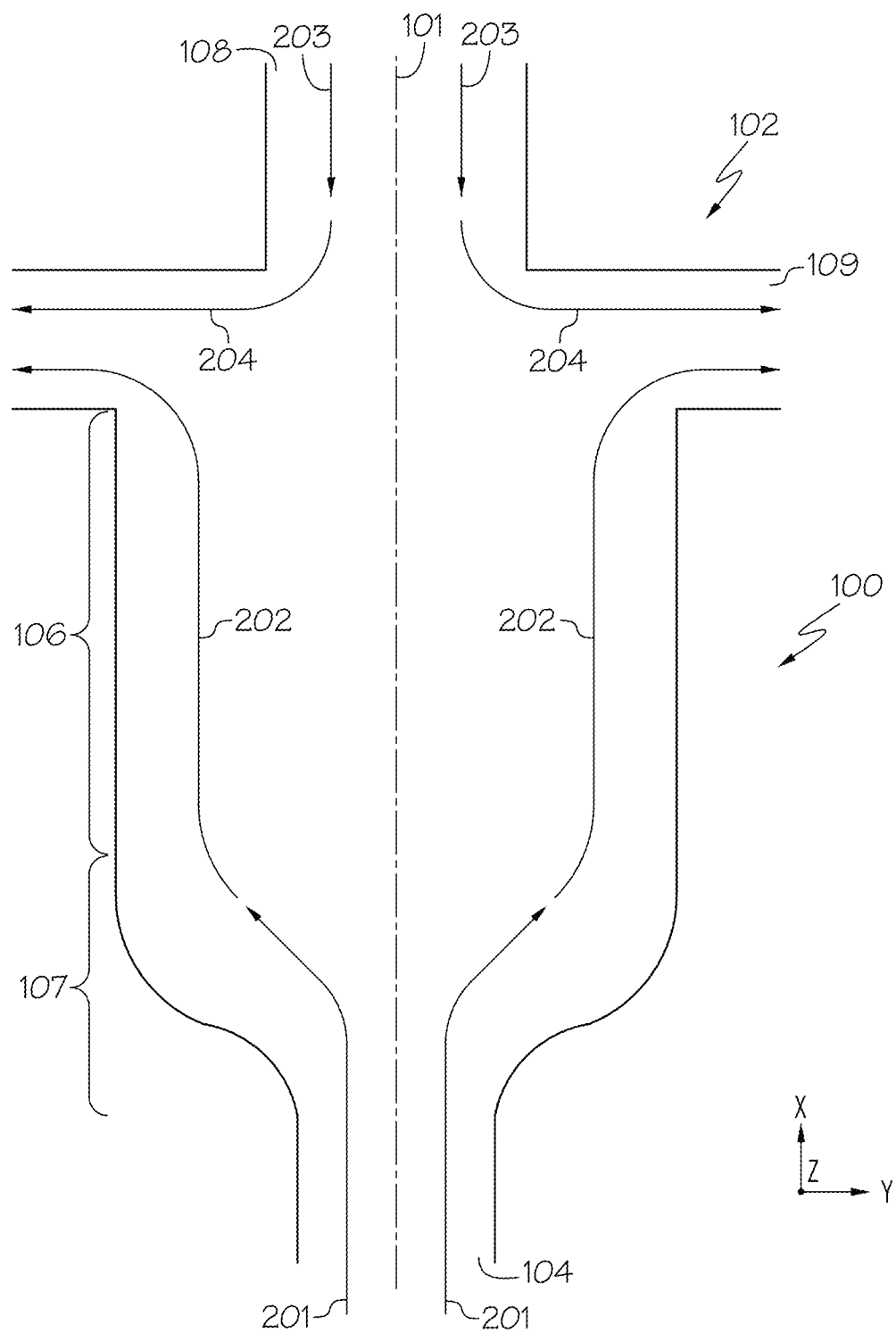
FIG. 2 schematically depicts the flow of air through an enclosure for providing a controlled environment, according to one or more embodiments disclosed herein.

Turning now to FIG. 2, fluid flow through the enclosure 100 is shown. The fluid flow is generally represented by flow lines 201-204. It should be understood that the flow lines 201-204 depict exemplary paths that fluid, such as air, may take through the enclosure 100 and that the flow of fluid is not limited specifically to the flow lines 201-204 in embodiments described herein.

Figure 5:
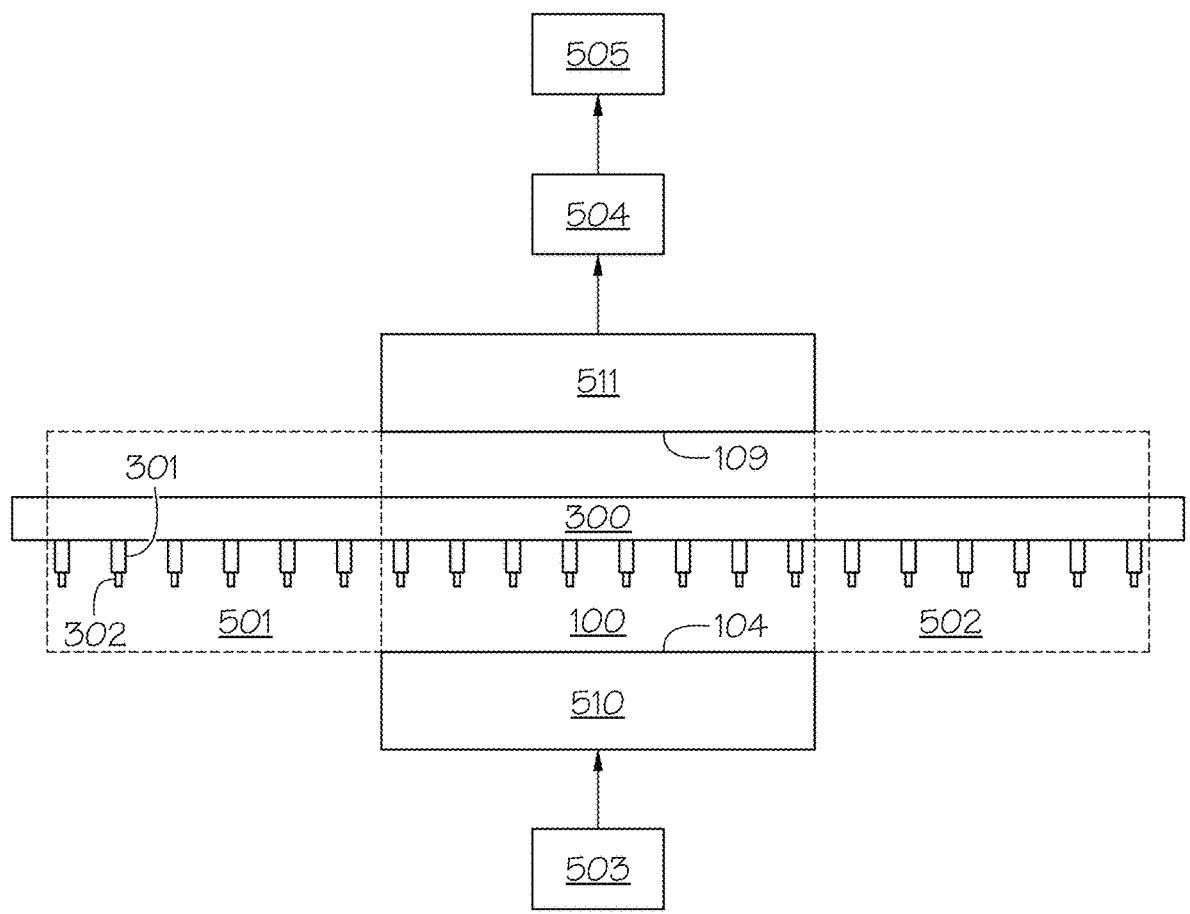
FIG. 5 schematically depicts a side view of a manufacturing line for producing glass articles, according to one or more embodiments disclosed herein.

Fluid enters the enclosure 100 through the inlet 104 as indicated by flow lines 201. The fluid is supplied to the inlet 104 at a predetermined temperature and humidity from a fluid source, such as fluid source 503 (FIG. 5). In embodiments, the fluid has a temperature of greater than or equal to 20° C. and less than or equal to 25° C. and a relative humidity (RH) of less than 60%. For example, the fluid may be supplied at a temperature from 20° C. to 25° C., from 21° C. to 25° C., from 22° C. to 25° C., from 23° C. to 25° C., or even from 24° C. to 25° C. In embodiments, the temperature is measured by any suitable means, for example, by thermometer, thermography, or the like. In further examples, the fluid may be supplied at a RH of less than 60%, less than 55%, less than 50%, less than 45%, or even less than 40%. In embodiments, RH is measured by any suitable means, for example, by hygrometer. Without being bound by theory, it is believed that having the glass articles in an environment at temperatures between 20° C. and 25° C. and at a RH below 60% shortly after coating may facilitate the evaporation of solvent used in the coating process and provide a uniform, high-quality coating on the glass articles.

In embodiments, the fluid supplied to the enclosure 100 is filtered before entering the enclosure 100. This can be achieved by passing the fluid through a high efficiency particulate air ("HEPA") filter before the fluid is provided to the inlet 104. Any suitable HEPA filtration system known in the art may be used to filter the fluid entering the enclosure 100. Moreover, it is contemplated that filters other than HEPA filters can be used, depending on the particular embodiment. Without being bound by theory, it is believed that passing the fluid through a HEPA filter may remove particles from the fluid which could interfere with the coating on glass articles within the enclosure. Thus, filtering the fluid before it enters the enclosure may lead to an increased coating quality on the glass articles. Additionally, passing the fluid entering the enclosure through a HEPA filter may remove particles that would contaminate the glass articles from entering the enclosure. Thus, filtering the fluid before it enters the enclosure may ensure that the glass articles are free from contaminants and suitable for use in, for example, pharmaceutical applications.

Referring again to FIG. 2, the fluid supplied to the enclosure 100 through the inlet 104 travels along flow lines 201 through the transition region 107 of the enclosure 100. In embodiments, fluid flow through the transition region 107 is substantially laminar (i.e., without eddies or other turbulent flow patterns). In such embodiments, the fluid passing from the inlet 104 through the transition region 107 moves toward the top end 102 of the enclosure 100 (e.g., in the +X direction), regardless of its motion in the Y and Z directions. In other words, the fluid flow through the transition region 107 is free from eddies or currents in which the air flows toward the bottom end 103 of the enclosure 100 (e.g., in the −X direction). Without wishing to be bound by theory, it is believed that the flow of fluid through the transitions region remains substantially laminar due to the smooth contours in the transition region as well as the ratio of Wallet 110 to $W_{chamber}$ 111.

The flow lines 202 depicted in FIG. 2 depict the flow of fluid through the chamber region 106 of the enclosure 100. As in the transition region 107, the flow of fluid through the chamber region 106 is substantially laminar. As depicted by flow lines 202, the fluid continues to move toward the top end 102 of the enclosure 100 (e.g., in the +X direction) until it reaches the outlet 109. Once the fluid reaches the outlet 109, the fluid flows through the outlet 109 and is removed from the enclosure 100. To assist in maintaining the flow of fluid in the +X direction from the inlet 104 to the outlet 109, in embodiments, a vacuum is applied to the outlet 109 to establish a pressure differential through the enclosure 100, as will be discussed in greater detail herein.

Figure 3:
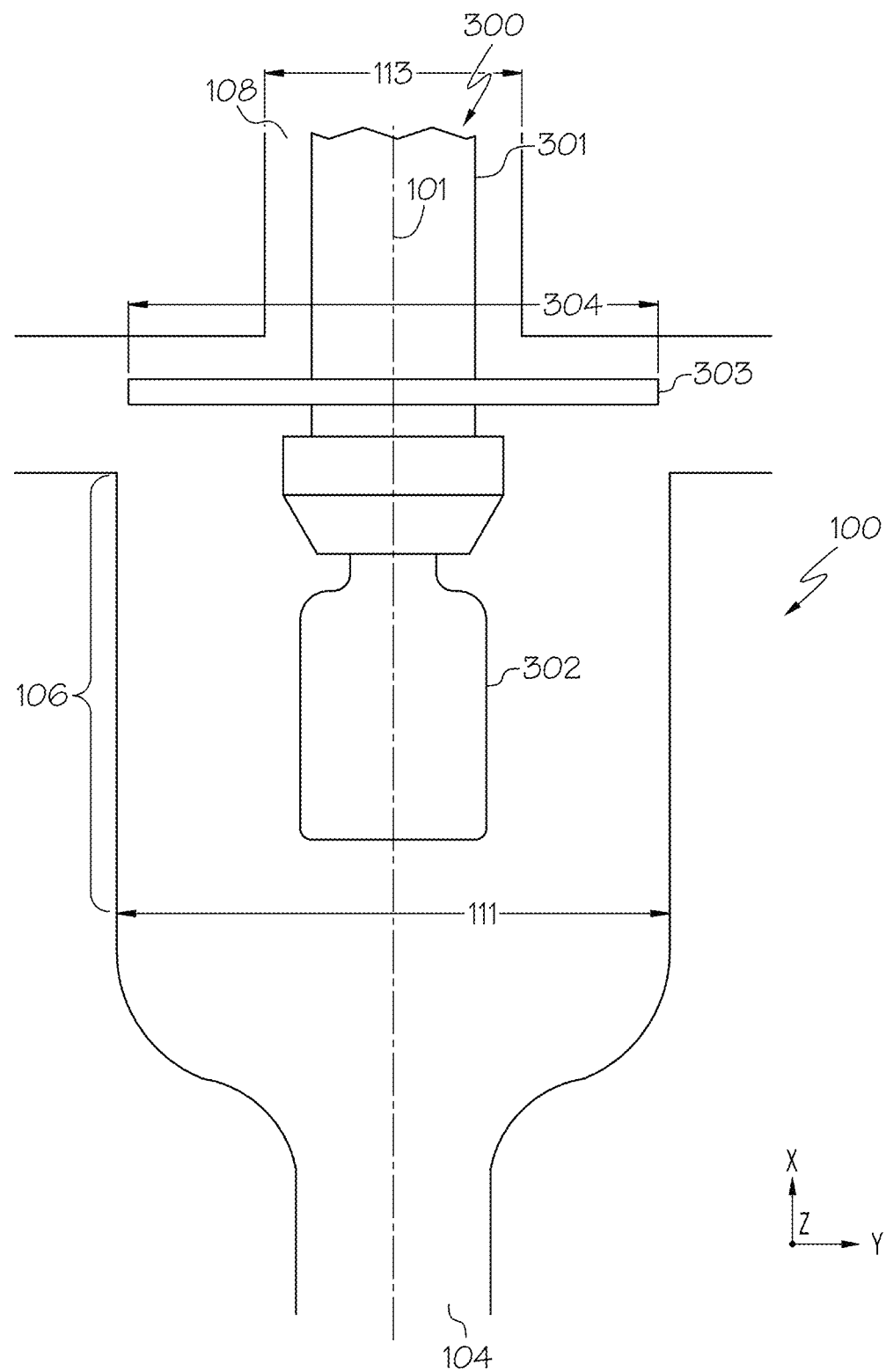
FIG. 3 schematically depicts a cross section of an enclosure with a glass article disposed therein, according to one or more embodiments disclosed herein.

In various embodiments, the fluid flow through the enclosure 100 is symmetric about the central plane 101. As depicted in FIG. 3, when a glass article 302, such as a glass vial, is positioned in the enclosure 100, the symmetric fluid flow uniformly engulfs the surfaces of the glass article 302 with conditioned fluid that enters the enclosure through the inlet 104, which may ensure that the glass article 302 is protected from ambient air that could contain particles that could disrupt the coating or contaminate the glass article 302. That is, the introduction of fluid into and through the enclosure 100 both flushes the volume of the enclosure of ambient air as well as supplies the interior volume of the enclosure with conditioned fluid (i.e., fluid having a desired temperature and/or relative humidity) which assists in uniformly processing a coating applied to the glass article. In embodiments, the glass article 302 may be a pharmaceutical container, such as a vial or syringe; however, the glass article 302 is not limited to such containers.

Returning to FIG. 2, it is also contemplated that some amount of ambient air may enter the enclosure 100 through the entry port 108 along flow lines 203. In contrast to the fluid supplied through the inlet 104, the ambient air entering the enclosure 100 through the entry port 108 is not temperature- or humidity-controlled or filtered to remove particulates. Accordingly, in embodiments, the position of the outlet 109 near the top end 102 of the enclosure 100 mitigates the flow of ambient air into the chamber region 106 through the entry port 108. As depicted by the flow lines 204, the ambient air exits the enclosure 100 through the outlet 109 before it is able to proceed into the chamber region 106.

As set forth above, in embodiments, the outlet 109 is fluidly coupled to a vacuum source (e.g., vacuum source 504 in FIG. 5), which assists in maintaining the flow of fluid through the enclosure 100 as described above. In particular, the vacuum can help to ensure that the ambient air exits the enclosure 100 before entering the chamber region 106 and that the fluid supplied through the inlet 104 constantly moves toward the top end 102 of the enclosure 100. Additionally, the vacuum may induce pressures within the enclosure 100 below ambient pressure, which, in embodiments, ensures that any solvent evaporating from the coatings on the glass articles within the enclosure 100 exits through the outlet 109, as further discussed herein. Pressure within the enclosure 100 can be maintained at a pressure below ambient air pressure by controlling the vacuum fluidly coupled to the outlet 109 as well as the flow rate of fluid supplied to the enclosure 100 through the inlet 104, so the flow rate of fluid supplied to the enclosure 100 through the inlet 104 is less than or equal to the flow rate of fluid exiting the enclosure 100 through the outlet 109. Accordingly, an aggregate flow of fluid through the outlet 109 is greater than the flow of fluid entering the enclosure through the inlets to maintain a negative pressure within the chamber region 106. Any suitable method for controlling the flow rate of fluid known and used in the art can be used to ensure that the pressure within the enclosure 100 is maintained below ambient air pressure, such as a vacuum pump.

Figure 4:
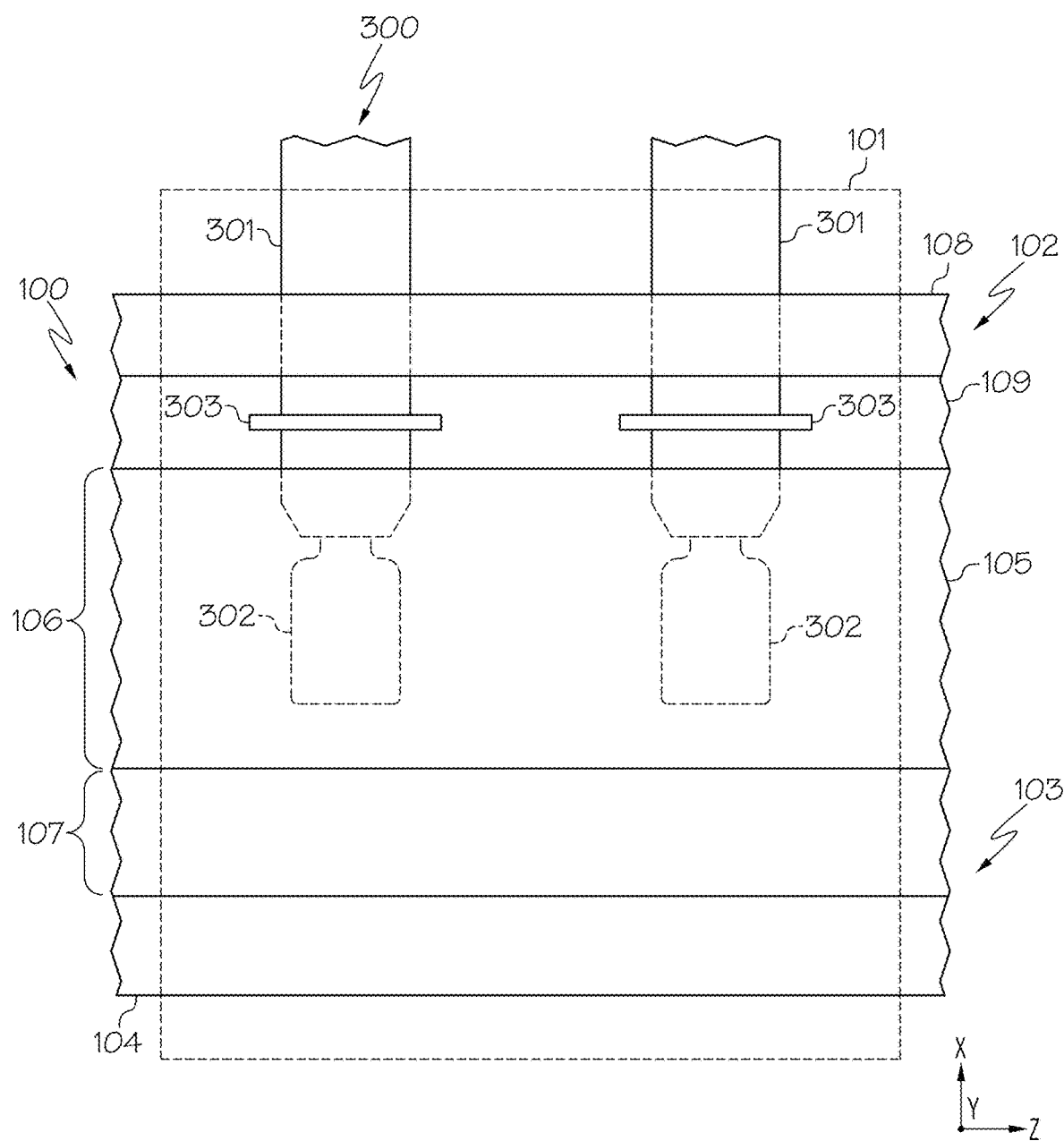
FIG. 4 schematically depicts an alternate side view of an enclosure for producing glass articles, according to one or more embodiments disclosed herein.

Referring now to FIGS. 3 and 4, the glass article 302 is coupled to a part carrier 300 through a gripping member 301 configured to move the glass article 302 along a manufacturing line through the enclosure 100. In particular, the gripping member 301 of the part carrier 300 extends through the entry port 108 of the enclosure 100 and holds the glass article 302 within the chamber region 106 of the enclosure 100. Suitable gripping members and part carriers are further described in U.S. Pat. No. 10,576,494, the entirety of which is incorporated by reference herein. The part carrier 300 moves the glass article 302 through the chamber region 106 of the enclosure 100 along a manufacturing line path (e.g., in the +Z direction), as depicted in FIGS. 3 and 4. In embodiments, the part carrier 300 moves the glass article 302 through the chamber region 106 along the central plane 101. In embodiments, the glass article 302 may be situated within the enclosure 100 such that the central plane 101 generally bisects the glass article.

In embodiments, the part carrier 300 comprises a plate 303 positioned between the entry port 108 and the chamber region 106 of the enclosure 100. The gripping member 301 is attached to the plate 303 so the plate 303 moves with the gripping member 301 through the enclosure 100. In embodiments, the plate 303 may be oriented such that a surface of the plate adjacent the entry port 108 lies in a plane normal to the central plane 101.

The plate 303 has a width, $w_{plate}$ 304. As used herein, $W_{plate}$ 304 refers to a maximum distance between two points on the edge of the plate 303 when measured across the plate 303 (as opposed to around the perimeter of the plate 303). In embodiments, $W_{plate}$ 304 is greater than or equal to $W_{chamber}$ 111. When $W_{plate}$ 304 is greater than $W_{chamber}$ 111, the plate 303 extend into the outlet 109. In embodiments, $W_{plate}$ 304 is greater than or equal to $W_{entry}$ 113. In such embodiments, the plate 303 ensures that there is no direct, linear path between the entry port 108 and the glass article 302. Accordingly, the plate 303 can deflect ambient air entering from the entry port 108 toward the outlet 109. Additionally, any particles that enter the enclosure 100 through the entry port 108 can be intercepted by the plate 303 and prevented from contacting the glass articles 302. In embodiments, $W_{plate}$ 304 may be greater than $W_{entry}$ 113 and less than $W_{chamber}$ 111.

In embodiments, the plate 303 may be in the form of a circular disk, although other shapes are contemplated. When the plate 303 has a circular shape, $W_{plate}$ corresponds to a diameter of the plate 303. In embodiments, a circular disk can advantageously uniformly direct the path of ambient air from the entry port 108 away from the glass article 302 being conveyed through the enclosure 100. Additionally, in embodiments in which the gripping member 301 rotates within the enclosure 100 (e.g., about an axis extending in the +/−X direction in the FIGS), the use of a circular disk maintains a constant relationship between $W_{plate}$ and $W_{chamber}$ or $W_{entry}$ at any point during the rotation of the gripping member 301.

FIG. 4 schematically depicts a side view of the enclosure 100 depicted in FIG. 3 to better illustrate the central plane 101 and the part carrier 300. As can be seen in FIG. 4, the part carrier 300 forms part of a manufacturing line for producing glass articles 302. The central plane 101 is an XZ plane and extends through the inlet 104 at the bottom end 103 of the enclosure 100 and through the entry port 108 at the top end 102 of the enclosure 100. Additionally, the central plane 101 extends along a length of the enclosure 100, where the length of the enclosure is measured in the +/−Z direction.

As shown in FIG. 4, the part carrier 300 includes a plurality of gripping members 301 that may be conveyed through the enclosure 100. Each of the gripping members 301 is coupled to and moves a corresponding glass article 302 through the chamber region 106 of the enclosure 100. The gripping members 301 move along a length of the enclosure 100 in series along the manufacturing line path. In one or more embodiments, the gripping members 301 move the glass articles 302 through the chamber region 106 along the central plane 101.

Referring now to FIG. 5, the part carrier 300 is positioned to facilitate movement of the glass articles 302 from a coating apparatus 501, where a coating is applied to the glass articles 302, through the enclosure 100, and to a curing apparatus 502, where the coating is cured on the surface of the glass articles 302. Other locations of the part carrier 300 (and the enclosure 100) within a glass article manufacturing line are contemplated and possible, depending on the particular embodiment. Moreover, it is contemplated that in embodiments, the gripping member 301 of the part carrier 300 can be replaced with a different interface for engaging the glass article 302, such as a platform on which the glass article 302 is positioned, a suction apparatus, or the like.

With reference to FIG. 5, in use, the gripping member 301 of the part carrier 300 engages a glass article 302, such as by a vacuum chuck or closing robotic fingers around a neck region of the glass article 302. The glass article 302 can be engaged, for example, in a coating apparatus 501 or upstream of the coating apparatus 501 (e.g., prior to the glass article 302 entering the coating apparatus 501) as the glass article 302 moves along a glass article manufacturing line. The gripping member 301 moves along the manufacturing line path and enters the enclosure 100, thereby traversing a glass article 302 into and through the enclosure 100.

In embodiments, the enclosure 100 can include an open end (not shown) that enables the glass article 302 to be passed between enclosure walls 105 of the enclosure 100 such that the glass article 302 is positioned within the chamber region 106 and the gripping member 301 extends through the entry port 108. In such embodiments, a fluid knife, such as an air knife or the like, may be positioned along the open end to prevent entry of particles and ambient air into the enclosure 100. In embodiments in which the enclosure 100 includes a single enclosure wall 105 that curves at one or both ends of the enclosure 100 such that the enclosure wall 105 includes a first portion of the inner surface 155 of the enclosure wall 105 that is parallel to and faces a second portion of the inner surface 155 of the enclosure wall 105, the entry port 108 can include a region near the end of the enclosure 100 that has a width that is wider than the glass article 302 and the part carrier 300 (including the gripping member 301 and the plate 303). In such embodiments, the part carrier 300 can vertically lower the glass article 302 (e.g., move the glass article 302 in the +/−X direction) into the chamber region 106 of the enclosure 100 through the entry port 108 as it moves the glass article 302 along the manufacturing line path (e.g., along the +/−Z direction).

As shown in FIG. 5, conditioned fluid enters the enclosure 100 through the inlet 104 from a fluid source 503, which, in embodiments, is coupled to the inlet 104 by a manifold 510. In embodiments, the manifold 510 may include baffles or perforated plates to facilitate uniform fluid flow through the inlet 104. The fluid is conditioned to have a predetermined temperature, humidity, and particulate level, which can be achieved through various heating, humidity, and filtration systems. In embodiments, the conditioned fluid is provided to the inlet 104 at a predetermined flow rate and pressure, and flows through the enclosure 100 to the outlet 109, as was previously described with reference to FIG. 2.

As described above, in embodiments, a vacuum source 504 is additionally applied to the outlet 109 of the enclosure 100. Accordingly, a vacuum pump or other vacuum source 504 can be fluidly coupled to the outlet 109 by a manifold 511 to pull fluid from the enclosure 100 through the outlet 109. The vacuum source 504, in embodiments, further establishes a negative pressure within the enclosure 100, as described above, to facilitate flow of the conditioned fluid from the bottom end 103 of the enclosure 100 toward the top end 102 of the enclosure 100 and through the outlet 109.

The part carrier 300 moves the glass articles 302 through the enclosure 100 along the manufacturing line path and, in embodiments, may further rotate the glass articles 302 around a rotation axis extending in the +/−X direction through the center of the glass article 302 and lying in the central plane 101. In embodiments, the part carrier 300, and more particularly, the gripping member 301, rotate the glass articles 302 at a rate of from 1000 to 3000 rotations per minute (RPM).

In embodiments, when the glass article 302 enters the enclosure 100, the glass article 302 has a coating thereon that includes one or more solvents. This solvent may evaporate from the surface of the glass article 302 while the coated glass article 302 is moving through the enclosure 100, thereby forming solvent vapors within the enclosure 100. For example, the solvent vapors may be released from the surface of the glass article 302 during a partial curing of the coating as a result of the temperature and/or humidity of the environment within the enclosure 100. In embodiments, the solvent vapors are flushed from the enclosure 100 by the fluid and exit the enclosure 100 through the outlet 109. Without being bound by theory, it is believed that maintaining a pressure below ambient pressure within the enclosure 100, as discussed previously, may prevent the escape of solvent from the enclosure 100 into the atmosphere. Negative pressure within the enclosure 100 ensures that nearly all the fluid within the enclosure 100 exits the enclosure 100 through the outlet 109, allowing the solvent to be removed from the fluid before the fluid is released into the environment.

In embodiments, fluid including the solvent vapors are directed from the outlet 109, through the manifold 511 and the vacuum source 504, and to a solvent recovery system 505 or an air remediation system that filters, adsorbs, or otherwise separates the solvent vapors from the fluid flowing through the outlet 109 before the fluid is released into the ambient environment or recycled. Such solvent capture may reduce the presence of solvent in the ambient environment and also facilitate reclamation and recycling of the fluid and solvent.

In embodiments, the enclosure 100 may be temperature controlled such that the enclosure 100 may act as a curing chamber. In such embodiments, the temperature within the enclosure is kept above 300° C. or higher, depending on the curing temperature of the coating. Accordingly, in embodiments, the air entering the enclosure 100 is heated. For example, heaters on the outside of metal pathways supplying air to the enclosure 100 may bring the temperature of the air entering the enclosure above 300° C. Alternatively, the air may be passed through a heating unit to bring the air to the desired temperature. Using the enclosure 100 as a curing chamber may prevent particles from sticking to a coating on the glass article before the coating is cured. Additionally or alternatively, in embodiments, the enclosure 100 is temperature controlled to control solvent flash-off. In such embodiments, the temperature of the enclosure 100 is limited by the flammability limit of solvent of the coating on the glass article 302, but generally ranges from 60° C. to 100° C.

The part carrier 300 continues to move the glass articles 302 along the manufacturing line path until it reaches the next manufacturing station or location, which, in embodiments, may be a curing apparatus 502. In embodiments, the coating on each of the glass articles 302 is cured within the enclosure 100, or the glass articles 302 may exit the enclosure 100 before being directed into the curing apparatus 502. Thus, it is contemplated that the curing apparatus 502 can be positioned within the enclosure 100 or adjacent to the enclosure 100, depending on the particular embodiment. The curing apparatus 502 may be any suitable type of curing apparatus, depending on the particular coating applied to the glass article 302. For example, the curing apparatus 502 may be an oven or a light source (e.g., an infrared or UV light source). The glass article 302 can be removed from the enclosure 100 in a manner similar to the manner in which it was positioned within the enclosure 100.

EXAMPLES

The examples are representative embodiments of the presently disclosed subject matter, and are not meant as limiting the scope of the claims.

Using ANSYS FLUENT™ (Ansys) software, a three-dimensional computational fluid dynamics (3D CFD) model was used to model the flow of fluid through an enclosure according to one or more embodiments discussed in the detailed description. Specifically, the modeled enclosure had a $W_{inlet}$ of 2.54 centimeters (cm), a $W_{chamber}$ of 7.62 cm, and two outlets with widths of 2.54 cm each. Additionally, $W_{entry}$ was 3.81 cm and the clearance between the gripping member and the entry port was 0.41 cm on each side of the gripping member. The velocity of air entering through the inlet was 1.8 m/s and the velocity of air exiting through the outlets was 1.0 m/s for each outlet; thus, there was an imbalance between the flow of air through the inlet and the outlets. The 3D CFD model was used to predict detailed flow patterns through the enclosure during steady state operation. The flow patterns of various fluids and particles are depicted by pathlines in FIGS. 6-10.

Figure 6:
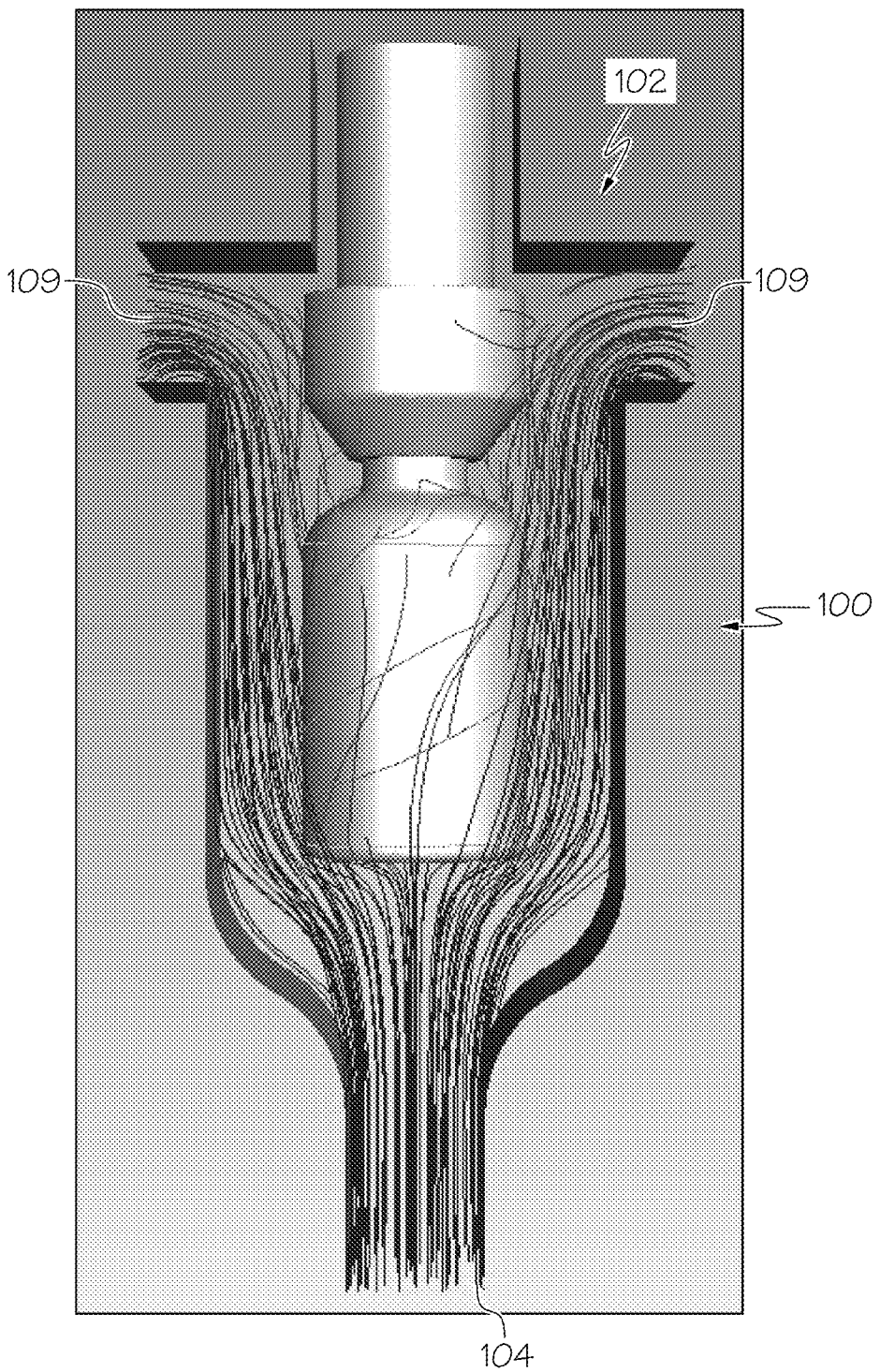
FIG. 6 is a three-dimensional computational fluid dynamics (3D CFD) model of air flowing through an enclosure for providing a controlled environment, according to one or more embodiments disclosed herein.

FIG. 6 depicts pathlines generated by the 3D CFD model to visualize the flow of fluid from the inlet 104 through the enclosure 100. As shown in FIG. 6, all of the fluid that entered through the inlet 104 left the enclosure 100 through the outlets 109. Additionally, the pathlines show that the flow of fluid was consistently in an upward direction, toward the top end 102 of the enclosure 100. The pathlines do not depict swirling or eddies in the flow of fluid from the inlet 104 through the enclosure 100, suggesting that the flow of fluid from the inlet 104 to the outlet 109 was substantially laminar.

Figure 7:
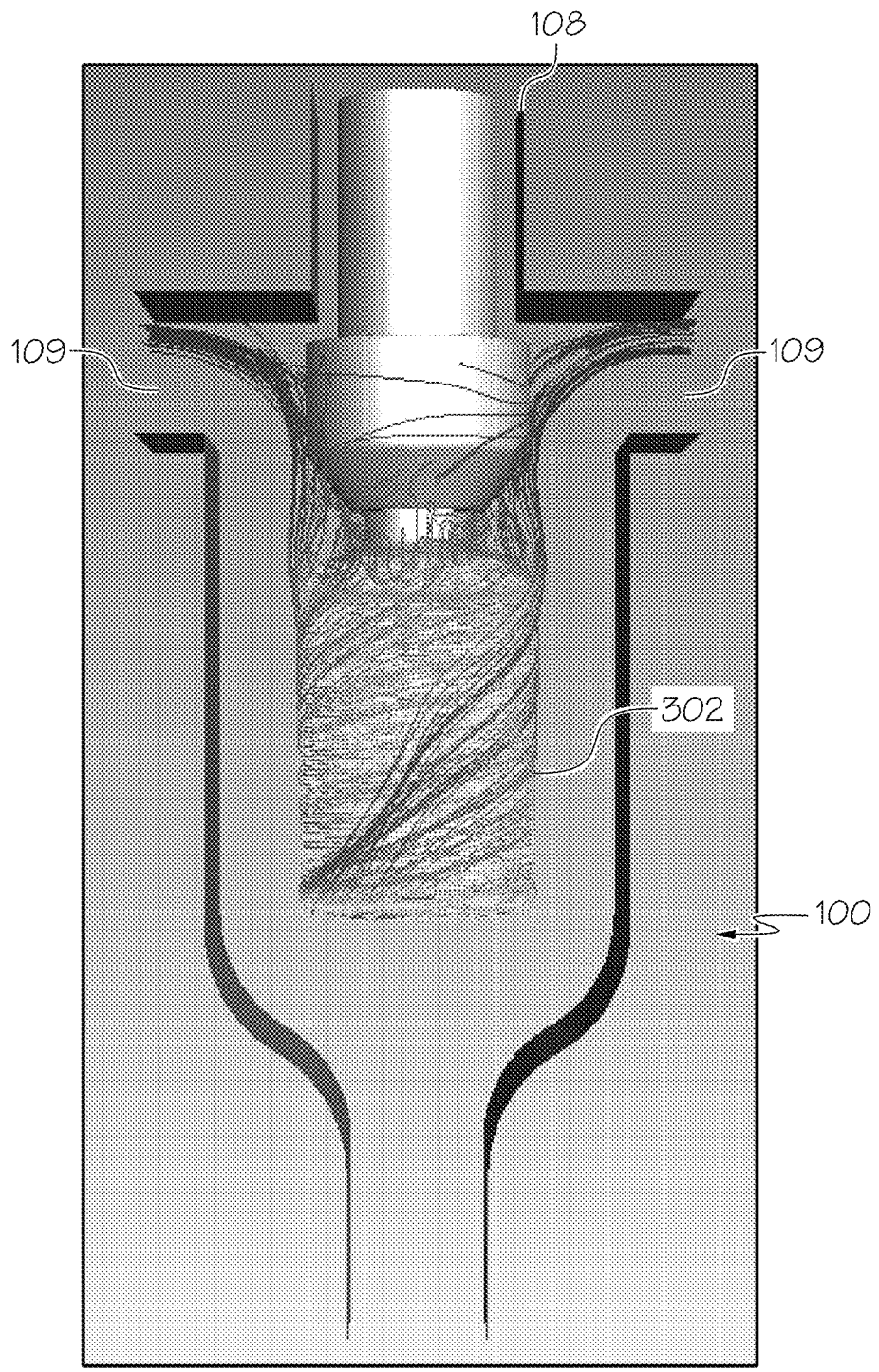
FIG. 7 is a 3D CFD model of air flowing from a vial within an enclosure for providing a controlled environment, according to one or more embodiments disclosed herein.

FIG. 7 depicts pathlines emanating from the glass article 302, which in this example is in the form of a glass vial. The pathlines show the flow of fluid from the surface of the glass article 302. This simulation accounted for the rotation of the glass article 302 within the enclosure 100 at a rate of 2000 RPM. Accordingly, the pathlines wrap around the glass article 302. As in FIG. 6, all of the pathlines in FIG. 7 point toward the outlets 109, suggesting that none of the fluid in contact with the glass article 302 left the enclosure 100 through the entry port 108.

Figure 8:
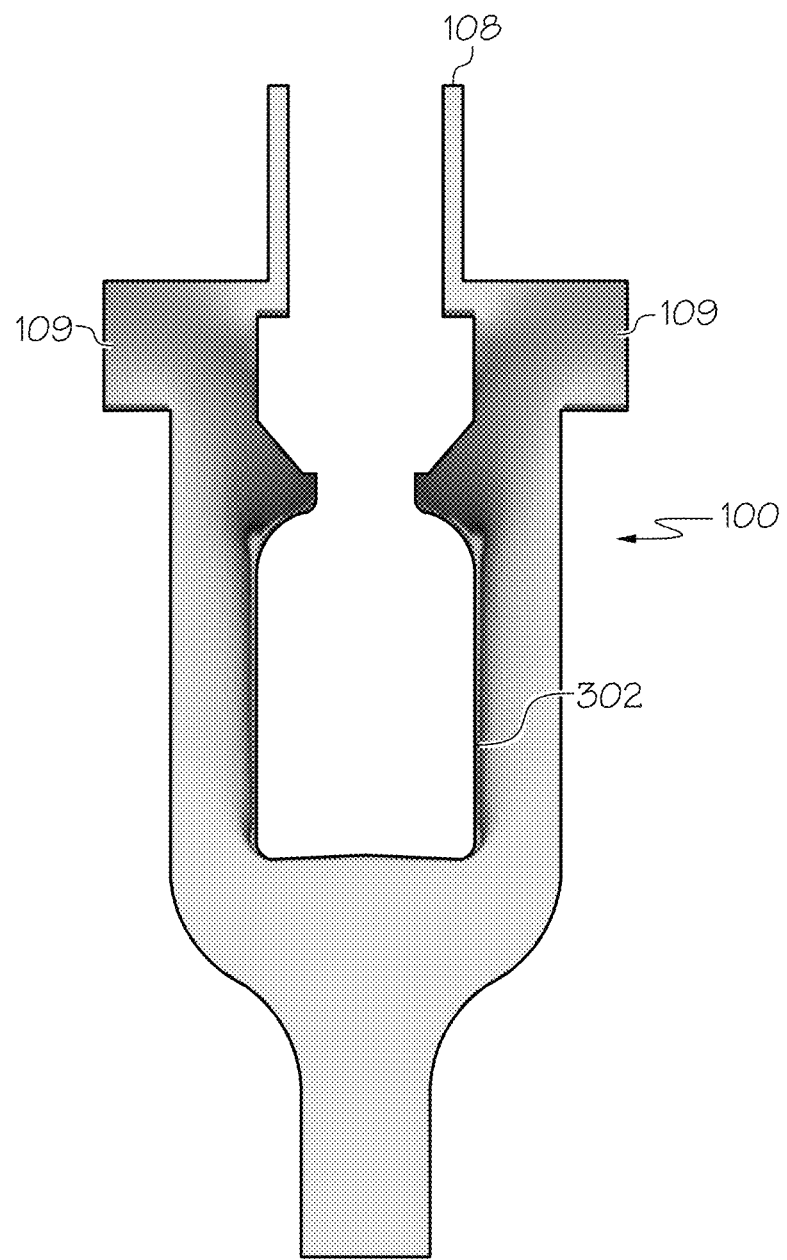
FIG. 8 is a 3D CFD model of solvent evaporating from the surface of a vial and passing through an enclosure for providing a controlled environment according to one or more embodiments disclosed herein.

FIG. 8 depicts the concentration of solvent vapor within the enclosure 100 when the concentration of solvent vapor at the surface of the glass article was 11% based on mass. FIG. 8 shows that the solvent vapor left the surface of the glass article and exited the enclosure 100 through the outlets 109, and not through the entry port 108.

Figure 9:
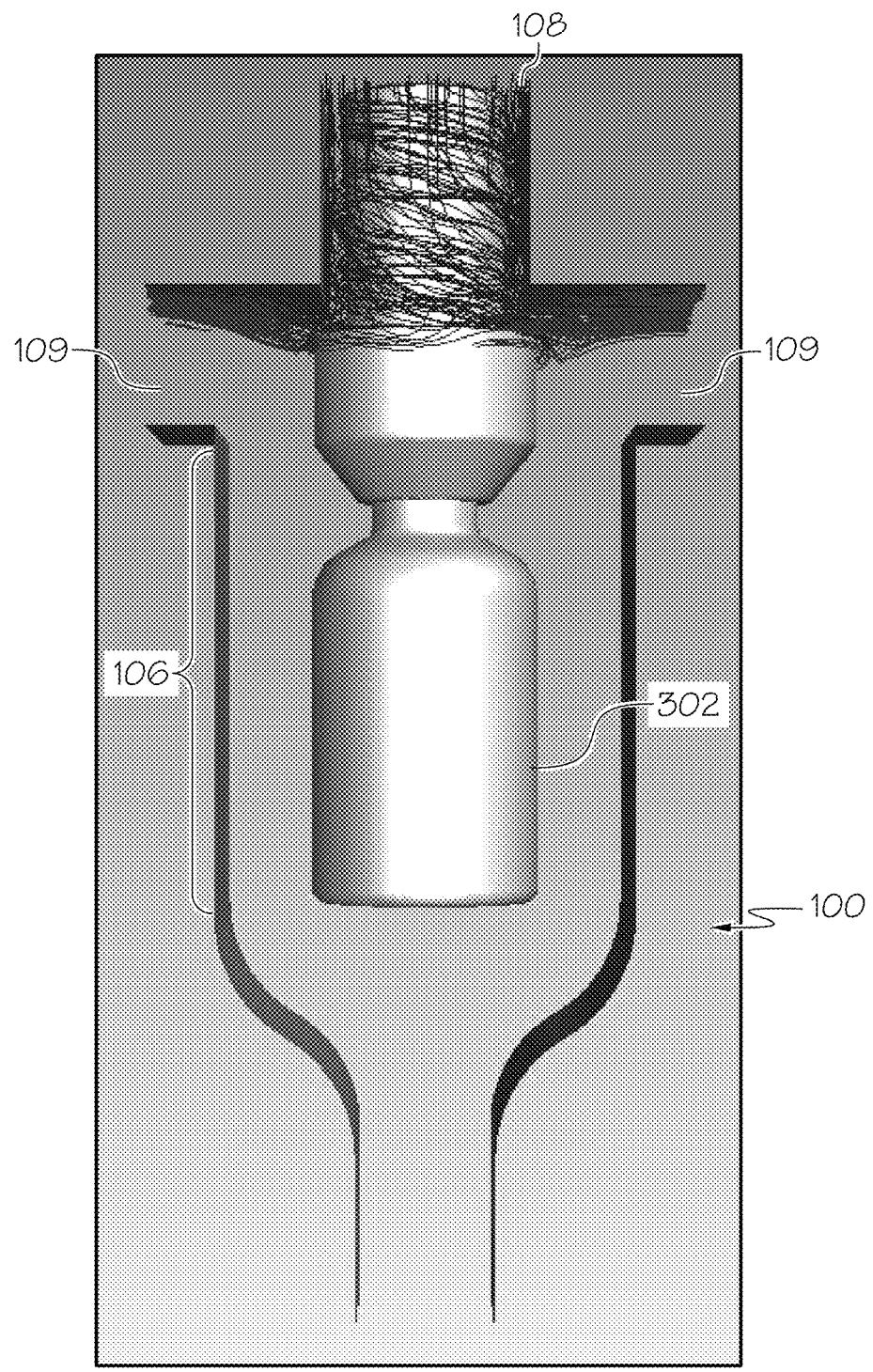
FIG. 9 is a 3D CFD model of air flowing through an enclosure for providing a controlled environment, according to one or more embodiments disclosed herein.

FIG. 9 depicts the flow of ambient air into the enclosure 100 through the entry port 108. In particular, the pathlines in FIG. 9 show that ambient air that entered the enclosure 100 through the entry port 108 exited the enclosure through the outlets 109, and did not enter the chamber region 106 of the enclosure 100 or contact the glass article 302. Additionally, the flow of ambient air into the enclosure 100 through the entry port 108 was believed to help prevent the leakage of solvent vapor from the enclosure through the entry port 108.

Figure 10:
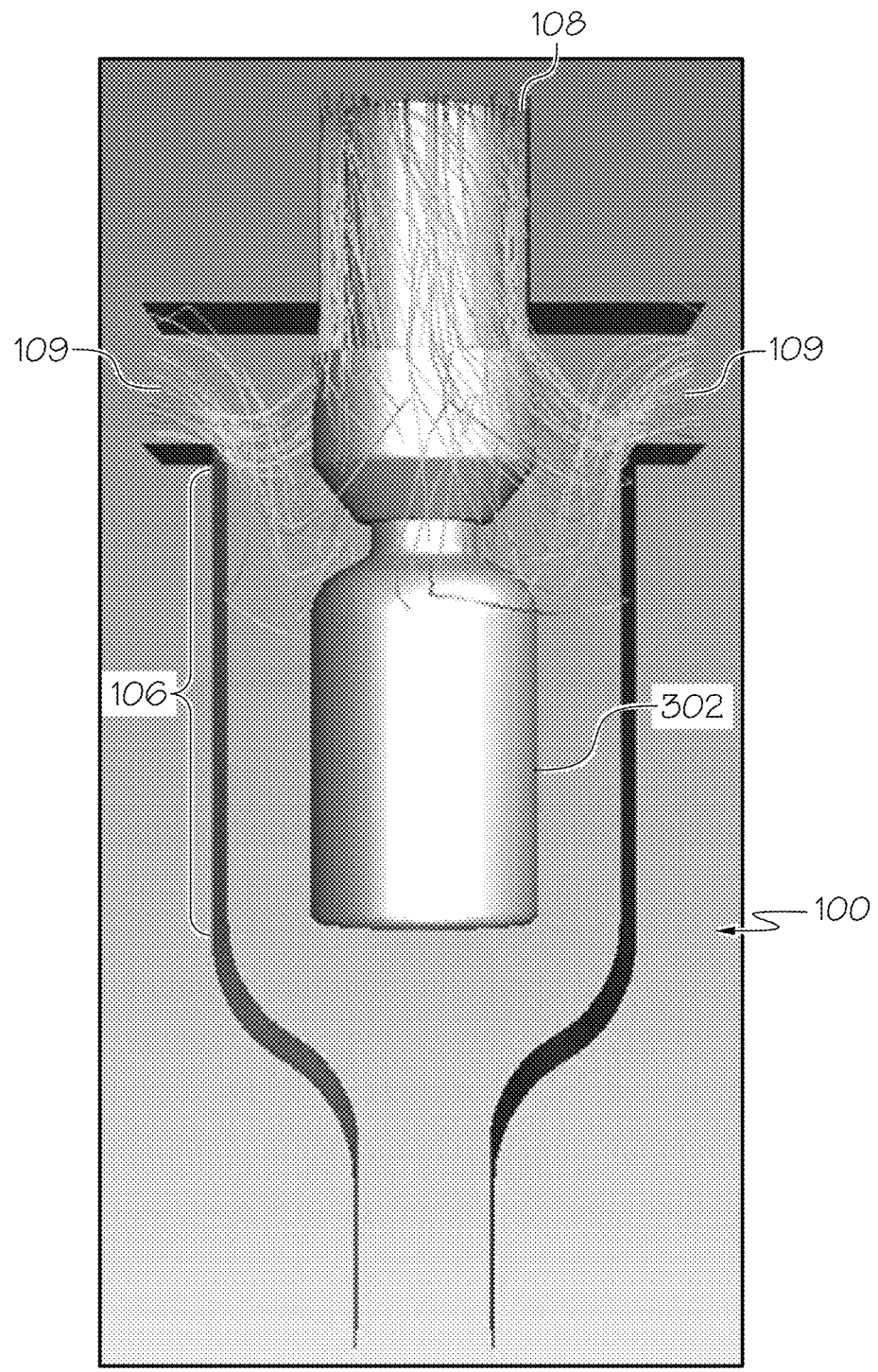
FIG. 10 is a 3D CFD model of particles flowing through an enclosure for providing a controlled environment, according to one or more embodiments disclosed herein.

Next, spherical particles having a diameter of 100 μm and a density of 2,000 kg/m³ were simulated entering the enclosure 100 through the entry port 108. Pathlines depicted in FIG. 10 show that most of these particles were removed from the enclosure 100 through the outlets 109 before they entered the chamber region 106 of the enclosure 100. However, some particles entered the chamber region 106 of the enclosure 100 and contacted the glass article 302. It is believed that a disk or plate included on the part carrier, such as plate 303 (FIG. 3), could catch these large particles before they entered the chamber region and could help direct smaller particles and air entering through the entry port 108 to the outlets 109 to be removed from the enclosure.

Figure 11:
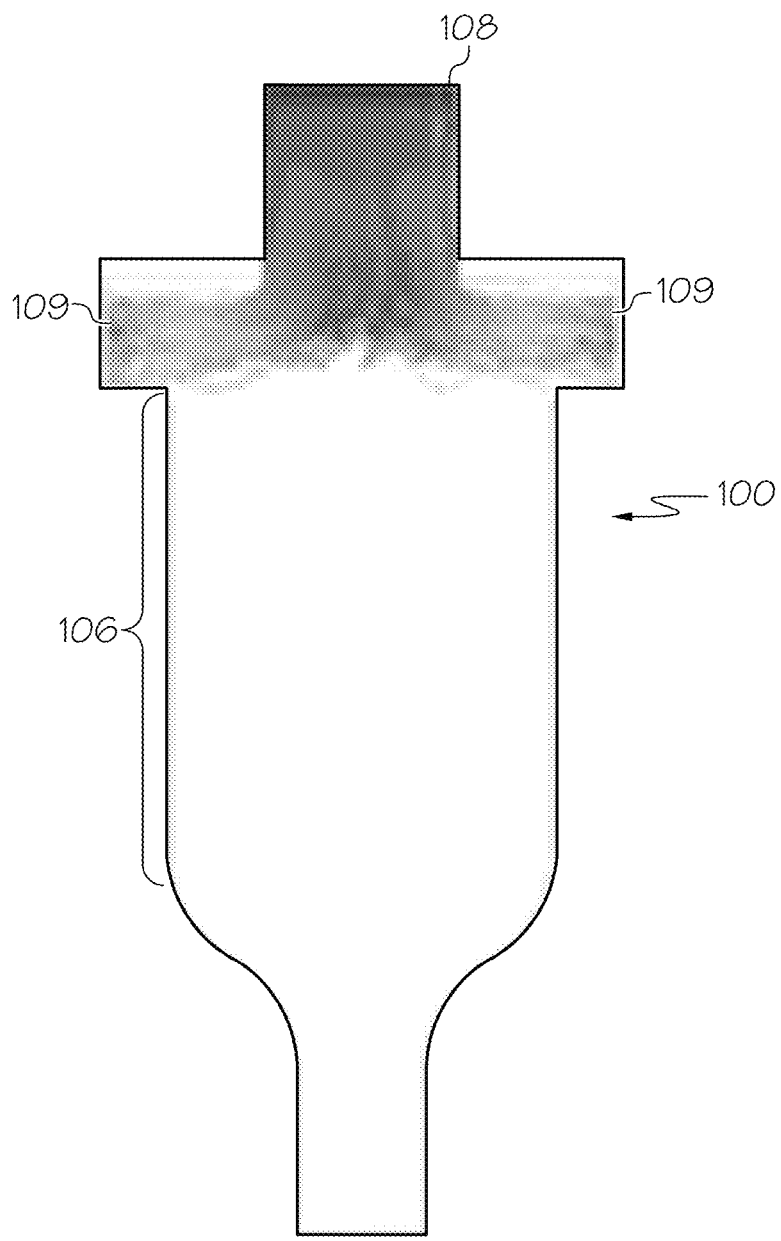
FIG. 11 is a 3D CFD model of particles flowing through an enclosure for providing a controlled environment, according to one or more embodiments described herein.

Additional modeling was performed on the flow of fluid through an enclosure 100 without a part carrier 300 or glass article 302. Spherical particles having a diameter of 100 μm and a density of 2,000 kg/m' were simulated entering the enclosure 100 through entry port 108. FIG. 11 depicts pathlines which show that the particles entering the enclosure 100 through the entry port 108 and exiting the enclosure 100 through the outlets 109. The particles did not enter the chamber region 106, even when there is no gripping member 301 occupying space within the entry port 108. Thus, it is unlikely that contaminants having a diameter of less than 100 μm and a density of 2,000 kg/m' would enter the enclosure 100 through the entry port 108 in the space between gripping members 301.

In a first aspect of the present disclosure, an enclosure for providing a controlled environment includes a central plane extending through a top end of the enclosure and a bottom end of the enclosure and bisecting the enclosure along a width of the enclosure; an inlet at the bottom end of the enclosure having an inlet width, $W_{inlet}$; an enclosure wall extending from the inlet to the top end of the enclosure; an entry port at the top end of the enclosure configured to receive a part carrier; and an outlet between the entry port and the chamber region of the enclosure wall. The enclosure wall includes a chamber region and a transition region between the inlet and the chamber region. A width of the chamber region, $W_{chamber}$, is substantially constant through the chamber region. The width of the enclosure in the transition region decreases from $W_{chamber}$ to $W_{inlet}$, and a ratio of $W_{inlet}$ to $W_{chamber}$ may be from 1:2 to 1:5. The central plane passes through the inlet and the entry port of the enclosure. The outlet extends along an outlet axis that is oriented at a non-zero angle with respect to the central plane.

A second aspect of the present disclosure may include the first aspect where the enclosure comprises reflection symmetry with respect to the central plane.

A third aspect of the present disclosure may include either of the first or second aspects were the width of the enclosure transitions from $W_{inlet}$ to $W_{chamber}$ over a distance of from 200 mm to 900 mm.

A fourth aspect of the present disclosure may include any of the first through third aspects where $W_{inlet}$ is from 4 mm to 45 mm.

A fifth aspect of the present disclosure may include any of the first through fourth aspects were $W_{chamber}$ is from 20 mm to 90 mm.

A sixth aspect of the present disclosure may include any of the first through fifth aspects where the enclosure wall comprises an S-shaped curve with an inflection point within the transition region.

A seventh aspect of the present disclosure may include any of the first through sixth aspects were the outlet axis is normal with respect to the central plane.

In an eighth aspect of the present disclosure, a manufacturing line for producing glass articles includes an enclosure and a part carrier. The enclosure includes a central plane extending through a top end of the enclosure and a bottom end of the enclosure and bisecting the enclosure along a width of the enclosure; an inlet at the bottom end of the enclosure having an inlet width, $W_{inlet}$; an enclosure wall extending from the inlet to the top end of the enclosure; an entry port at the top end of the enclosure configured to receive the part carrier; and an outlet between the entry port and the chamber region of the enclosure wall. The enclosure wall includes a chamber region and a transition region between the inlet and the chamber region. A width of the chamber region, $W_{chamber}$, is substantially constant through the chamber region. The width of the enclosure in the transition region decreases from $W_{chamber}$ to $W_{inlet}$, and a ratio of $W_{inlet}$ to $W_{chamber}$ may be from 1:2 to 1:5. The central plane passes through the inlet and the entry port of the enclosure. The outlet extends along an outlet axis that is oriented at a non-zero angle with respect to the central plane. A gripping member of the part carrier is positioned through the entry port, and the part carrier is configured to move a glass article through the chamber region of the enclosure.

A ninth aspect of the present disclosure may include the eighth aspect where the part carrier comprises a plate positioned between the entry port and the chamber region and extending along a plane normal to the central plane, the gripping member extending through the plate.

A tenth aspect of the present disclosure may include the ninth aspect where the plate has a width, $W_{plate}$, that is greater than or equal to $W_{chamber}$.

An eleventh aspect of the present disclosure may include either of the ninth or tenth aspects where the entry port has a width, $W_{entry}$, and the width of the plate $W_{plate}$ greater than the $W_{plate}$ width of the entry port, $W_{entry}$.

A twelfth aspect of the present disclosure may include any of the ninth through eleventh aspects where the width of the entry port, $W_{entry}$, is less than the width of the chamber region, $W_{chamber}$.

A thirteenth aspect of the present disclosure may include any of the ninth through twelfth aspects where the plate extends into the outlet.

A fourteenth aspect of the present disclosure may include the ninth aspect where the plate comprises a disk with a diameter greater than or equal to $W_{chamber}$.

A fifteenth aspect of the present disclosure may include any of the eighth through fourteenth aspects where outlet axis is normal with respect to the central plane.

In a sixteenth aspect of the present disclosure, a method for transporting a coated article comprises positioning the coated article within an enclosure; supplying a flow of fluid to the enclosure through the inlet; removing a flow of fluid from the enclosure through the outlet; and moving the coated article along a path through the enclosure, where the path is substantially parallel to the central plane. The enclosure comprises a central plane extending through a top end of the enclosure and a bottom end of the enclosure and bisecting the enclosure along a width of the enclosure; an inlet at the bottom end of the enclosure having an inlet width, $W_{inlet}$; an enclosure wall extending from the inlet to the top end of the enclosure; an entry port at the top end of the enclosure configured to receive a part carrier; and an outlet between the entry port and the chamber region of the enclosure wall. The enclosure wall comprises a chamber region and a transition region between the inlet and the chamber region. A width of the chamber region, $W_{chamber}$, is substantially constant through the chamber region. The width of the enclosure in the transition region decreases from $W_{chamber}$ to $W_{inlet}$, and a ratio of $W_{inlet}$ to $W_{chamber}$ is from 1:2 to 1:5. The central plane passes through the inlet and the entry port of the enclosure and the outlet extends along an outlet axis oriented at a non-zero angle with respect to the central plane.

A seventeenth aspect of the present disclosure may include the sixteenth aspect where vapors evaporate from the coated article during the moving of the coated article through the enclosure and are extracted from the enclosure through the outlet.

An eighteenth aspect of the present disclosure may include either of the sixteenth or seventeenth aspects where moving the coated article further comprises rotating the coated article around an axis central to the coated article and substantially parallel to the central plane.

A nineteenth aspect of the present disclosure may include the eighteenth aspect where the rotation of the coated article may be at a rate from 1000 to 3000 rpm.

A twentieth aspect of the present disclosure may include any of the sixteenth through eighteenth aspects where a pressure within the enclosure is less than an ambient air pressure.

A twenty-first aspect of the present disclosure may include any of the sixteenth through twentieth aspects where removing the flow of fluid from the enclosure comprises applying a vacuum to the outlet.

A twenty-second aspect of the present disclosure may include any of the sixteenth through twenty-first aspects where the flow of fluid through the enclosure is substantially laminar.

A twenty-third aspect of the present disclosure may include any of the sixteenth through twenty-second aspects where the fluid supplied to the enclosure has a temperature from 20 to 25° C. and a relative humidity of less than 60%.

A twenty-fourth aspect of the present disclosure may include any of the sixteenth through twenty-third aspects where supplying the flow of fluid to the enclosure further comprises passing the air through a HEPA filter.

A twenty-fifth aspect of the present disclosure may include any of the sixteenth through twenty-fourth aspects where the fluid supplied to the enclosure has a temperature greater than 300° C. such that the coated article is cured within the enclosure.

It will be apparent to those skilled in the art that various modifications and variations can be made to the embodiments described herein without departing from the spirit and scope of the embodiments. Since modifications, combinations, sub-combinations, and variations of the disclosed embodiments incorporating the spirit and substance of the embodiments may occur to persons skilled in the art, the embodiments should be construed to include everything within the scope of the appended claims and their equivalents.

We claim:

1. An enclosure for providing a controlled environment during production of a glass article, the enclosure comprising:
   a central plane extending through a top end of the enclosure and a bottom end of the enclosure and bisecting the enclosure along a width of the enclosure;
   an inlet at the bottom end of the enclosure having an inlet width, $W_{inlet}$;
   an enclosure wall extending from the inlet to the top end of the enclosure, the enclosure wall comprising a chamber region and a transition region between the inlet and the chamber region, wherein a width of the chamber region, $W_{chamber}$, is substantially constant through the chamber region, the width of the enclosure in the transition region decreases from $W_{chamber}$ to $W_{inlet}$, and a ratio of $W_{inlet}$ to $W_{chamber}$ is from 1:2 to 1:5;
   an entry port at the top end of the enclosure sized and configured to receive a part carrier configured to move the glass article through the chamber region such that an entirety of the glass article is within the chamber region; and
   an outlet between the entry port and the chamber region of the enclosure wall;
   wherein the central plane passes through the inlet and the entry port of the enclosure and the outlet extends along an outlet axis that is oriented at a non-zero angle with respect to the central plane, and
   wherein the inlet is configured for supplying a flow of fluid into the enclosure through the inlet, and the outlet is configured for removing a flow of fluid from the enclosure through the outlet, and
   wherein the enclosure is configured for the flow of fluid into the chamber region via the inlet, and then out of the enclosure through the outlet.

2. The enclosure of claim 1, wherein the enclosure comprises reflection symmetry with respect to the central plane.

3. The enclosure of claim 1, wherein the width of the enclosure transitions from $W_{inlet}$ to $W_{chamber}$ over a distance of from 200 mm to 900 mm.

4. The enclosure of claim 1, wherein $W_{inlet}$ is from 4 mm to 45 mm.

5. The enclosure of claim 1, wherein $W_{chamber}$ is from 20 mm to 90 mm.

6. The enclosure of claim 1, wherein the enclosure wall comprises an S-shaped curve with an inflection point within the transition region.

7. The enclosure of claim 1, wherein the outlet axis is normal with respect to the central plane.

8. A manufacturing line for producing glass articles comprising:
   an enclosure, wherein the enclosure comprises:
      a central plane extending through a top end of the enclosure and a bottom end of the enclosure and bisecting the enclosure along a width of the enclosure, the central plane being an XZ plane;
      an inlet at the bottom end of the enclosure having an inlet width, $W_{inlet}$, extending in the Y direction;
      an enclosure wall extending from the inlet to the top end of the enclosure, the enclosure wall comprising a chamber region and a transition region between the inlet and the chamber region, wherein a width of the chamber region, $W_{chamber}$, is substantially constant through the chamber region, the width of the enclosure in the transition region decreases from $W_{chamber}$ to $W_{inlet}$ along the X direction, and a ratio of $W_{inlet}$ to $W_{chamber}$ is from 1:2 to 1:5;
      an entry port at the top end of the enclosure sized and configured to receive a part carrier configured to move the glass article through the chamber region such that an entirety of the glass article is within the chamber region; and
      an outlet between the entry port and the chamber region of the enclosure wall;
      wherein the central plane passes through the inlet and the entry port of the enclosure and the outlet extends along an outlet axis oriented at a non-zero angle with respect to the central plane; and
   a part carrier, wherein a gripping member of the part carrier is positioned through the entry port and the part carrier is configured to move a glass article through the chamber region of the enclosure in a Z direction, and
   wherein the inlet is configured for supplying a flow of fluid into the enclosure through the inlet, and the outlet is configured for removing a flow of fluid from the enclosure through the outlet,
   wherein the top end and the bottom end of the enclosure are spaced apart along the X axis, the X, Y, and Z axes being orthogonal to each other, and
   wherein the enclosure is configured for the flow of fluid into the chamber region via the inlet, and then out of the enclosure through the outlet.

9. The manufacturing line of claim 8, wherein the part carrier comprises a plate positioned between the entry port and the chamber region and extending along a plane normal to the central plane, the gripping member extending through the plate.

10. The manufacturing line of claim 9, wherein the plate has a width, $W_{plate}$, that is greater than or equal to W chamber.

11. The manufacturing line of claim 9, wherein the entry port has a width, $W_{entry}$, and the width of the plate $W_{plate}$ is greater than the width of the entry port, $W_{entry}$.

12. The manufacturing line of claim 11, wherein the width of the entry port, $W_{entry}$, is less than the width of the chamber region, $W_{chamber}$.

13. The manufacturing line of claim 9, wherein the plate extends into the outlet.

14. The manufacturing line of claim 9, wherein the plate comprises a disk with a diameter greater than or equal to $W_{chamber}$.

15. The manufacturing line of claim 8, wherein the outlet axis is normal with respect to the central plane.

* * * * *